United States Patent [19]
Daniels

[11] 3,901,557
[45] Aug. 26, 1975

[54] BEARING ASSEMBLIES

[75] Inventor: Douglas William Daniels, Bristol, England

[73] Assignee: Rolls-Royce (1971) Limited, London, England

[22] Filed: Apr. 3, 1973

[21] Appl. No.: 347,562

[30] Foreign Application Priority Data
Apr. 18, 1972  United Kingdom............ 17793/72

[52] U.S. Cl. ................................................ 308/15
[51] Int. Cl. ............................................ F16c 35/08
[58] Field of Search ............................... 308/15, 22

[56] References Cited
UNITED STATES PATENTS
3,473,853  10/1969  Goss et al. ........................... 308/15

*Primary Examiner*—Evon C. Blunk
*Assistant Examiner*—Robert Saifer
*Attorney, Agent, or Firm*—Stevens, Davis, Miller & Mosher

[57] ABSTRACT

A rotatable assembly particularly with reference to a gas turbine engine and having a bearing housing capable of deformation under a large out of balance load applied thereto by the rotation of an out of balance shaft, the bearing housing being in two parts and having a flange co-operating with two rings and a groove for locating the shaft during and subsequent to the deformation.

9 Claims, 3 Drawing Figures

BEARING ASSEMBLIES

This invention relates to rotatable assemblies.

In the design of rotatable assemblies it is sometimes necessary to provide a construction capable of operating under changed or adverse conditions.

In particular it may be necessary to accommodate small unpredictable movements of a bearing while at the same time locating that bearing in spatial relationship with other elements. An example of this may be found in a front fan gas turbine engine wherein a shaft drivingly connecting a fan to a turbine is supported by a thrust bearing situated next to the fan and by two roller bearings. In operation a large unbalanced load may be imposed on the rotating shaft, for example by the loss of all or part of a fan blade due to the ingestion of a bird. This load which is unpredictable tends to deflect the shaft which can cause damage to the bearings and surrounding structure.

The thrust bearing will not only move radially outwards due to the deflection of the shaft but will also seek to move axially, the amount of axial movement being determined by the position of the point about which the shaft deflects.

To prevent destruction of the engine, the shaft, and therefore the thrust bearing must always be located relative to the engine.

According to the present invention there is provided a rotatable assembly comprising a shaft, a bearing supporting the shaft for rotation, a bearing housing within which the bearing is disposed, the bearing housing being constructed so as to be capable of deforming under abnormal out of balance forces on the shaft to allow orbiting motion of the shaft and wherein there is connected to the bearing housing means for accommodating both unpredictable radial and axial movements of the bearing during said orbiting movement.

Preferably the housing is constructed in two parts defining a cavity therebetween and a collapsible member is disposed in the cavity to allow the deformation of the housing.

According to a feature of the invention therefore one of said parts of the bearing housing is provided with a flange which projects into a corresponding groove in the other of said parts, and a pair of moveable rings are disposed in the groove which contact opposite sides of the flange and guide the flange to accommodate deflections of the shaft.

The sides of the flange may be in the form of parallel frusto-spherical surfaces.

Where the bearing which supports the shaft for rotation is a thrust bearing, the flange and rings are adapted to transmit the thrust on the bearing to the engine casing.

A particular embodiment of the invention will now be described by way of example only with reference to the accompanying drawings in which.

Figure 1:
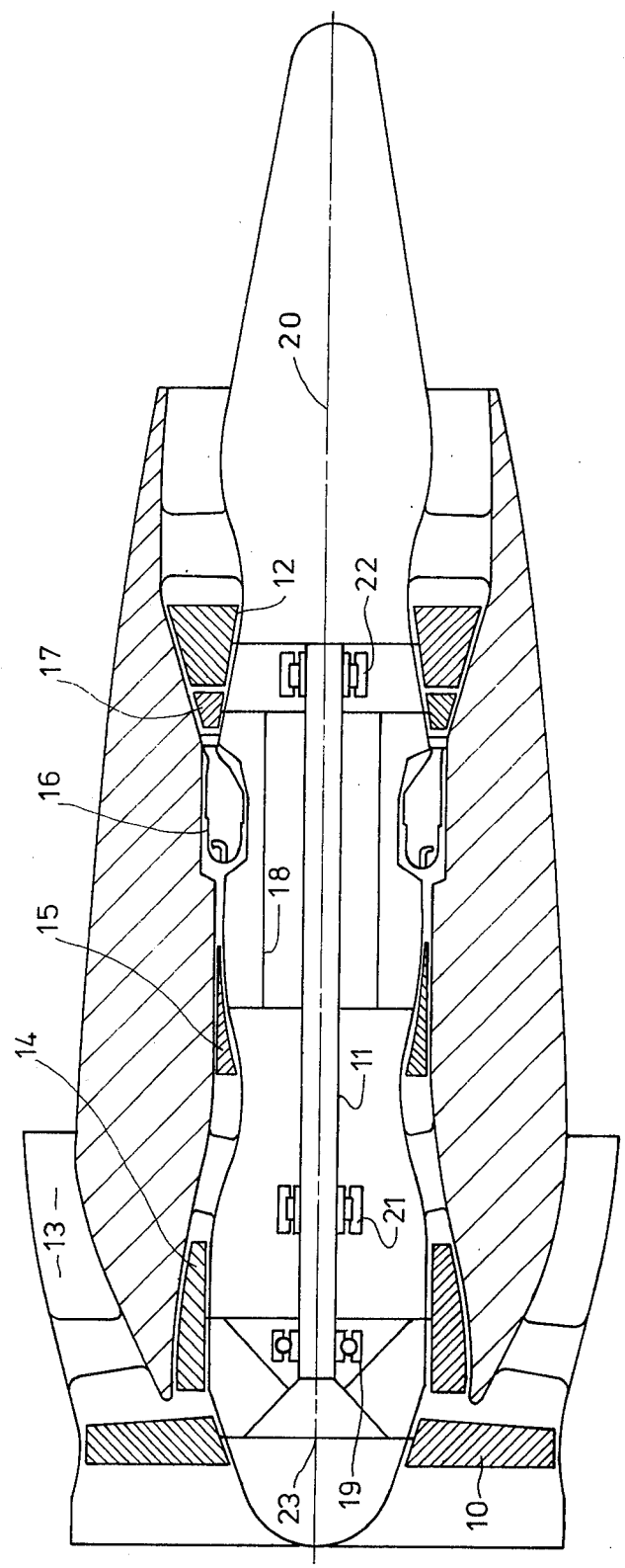
FIG. 1 is a schematic view of a longitudinal section through a gas turbine engine.

In FIG. 1 the engine has a fan 10 which is connected by a shaft 11 to a low pressure turbine 12, and which delivers air to a bypass duct 13, and to a low pressure compressor 14 also connected to the shaft 11. Compressed air from the compressor 14 is further compressed by a high pressure compressor 15, before being mixed with fuel and burned in a combustion chamber 16. The combustion products drive a high pressure turbine 17 before passing to the low pressure turbine 12. The high pressure turbine drives the high pressure compressor 15 via a shaft 18. The shaft 11 is supported for rotation about an axis 20 by a thrust bearing 19 mounted close to the fan, a roller bearing 21 intermediate between the fan and the low pressure turbine, and a second roller bearing 22 next to the turbine. In operation the loss of part of the blading of the fan, for example due to the ingestion of a bird, results in a large out of balance load being suddenly applied in a radial direction to the forward end 23 of the shaft.

This radial load may be of such a magnitude as to break a housing supporting the thrust bearing, or the shaft. The problem is aggravated if either the housing is too rigidly mounted or the shaft is too stiff. Thus it is desirable that the housing be mounted progressively to deform under an applied radial load and, that the shaft is sufficiently flexible to deflect and orbit in the increased space available, once the housing has deformed.

Figure 2:
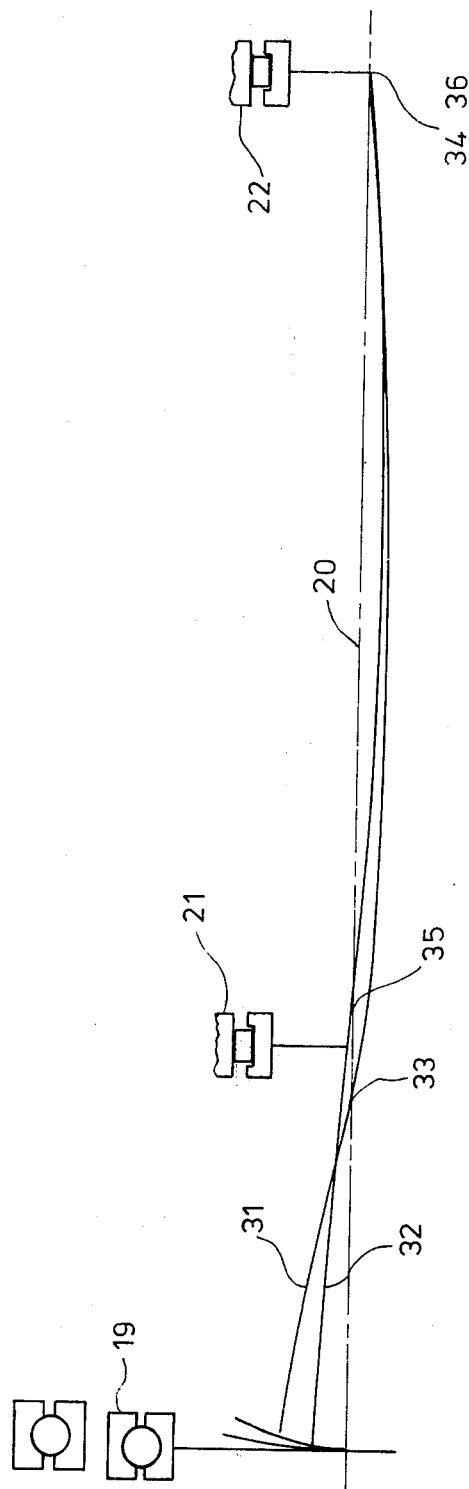
FIG. 2 is a diagrammatic representation of the mainshaft of the engine of FIG. 1 and of the bearings supporting the shaft, and, FIG. 3 is a detailed section through the main shaft and bearings of the engine of FIG. 1.

Referring now to FIG. 2, there are shown two different deflected configurations 31, 32 of the shaft of FIG. 1. These two different configurations are only two of the various configurations that arise as the shaft deflects under load.

It will be seen that in each configuration there are two points of zero deflection from the original axis 20, these points 33, 34; 35, 36 respectively are called node points. The rearward node points 34, 36 coincide and are situated approximately at the center of the second roller bearing 22 while the forward node points 33, 35 are axially separated from each other and situated in the region of the first roller bearing 21.

Thus the deflection of the shaft at the two roller bearings is relatively small and can be accommodated by the clearances in the bearings and their mountings. These clearances between the bearings and their mountings may be increased by, for example, the use of hydrodynamic squeeze films 69. In this way the first and second roller bearings 21, 22 respectively are adapted to allow the shaft 11 to rotate therein while deflected.

The thrust bearing 19 is fixed to the shaft and therefore moves in an arc about whichever of the node points 33, 35 is appropriate to the deflection of the shaft. In practice there are, of course, a large number of positions for the forward node point each corresponding to a different deflection of the shaft.

Figure 3:
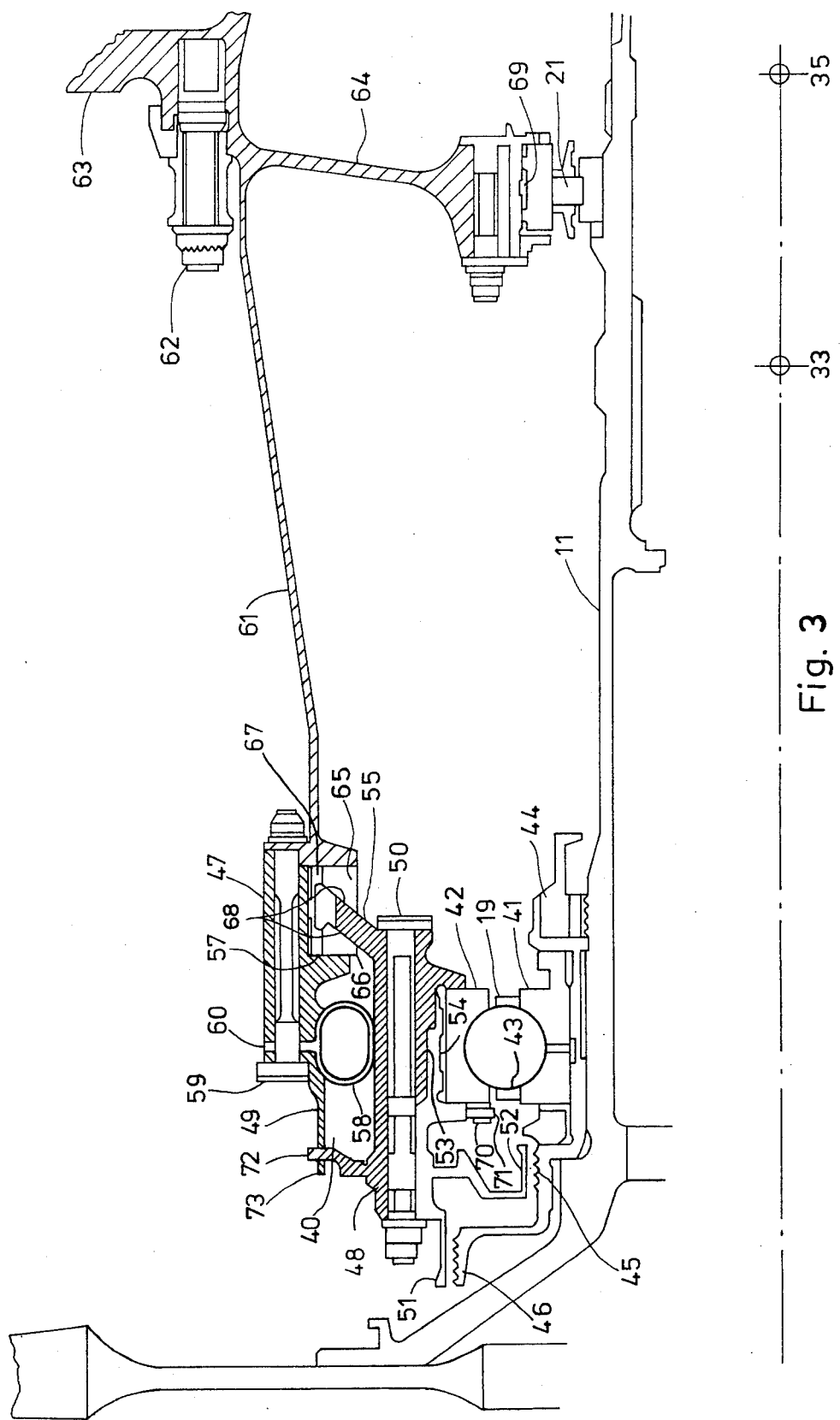

The shaft must at all times be located axially, within limits, relative to the rest of the gas turbine engine to prevent the rotating structure from destroying the static structure. It is therefore, necessary to accommodate both the radial movement of the forward end of the shaft and the consequent tilting of the thrust bearing housing, while providing reaction to the normal forces acting on the rotating shaft. FIG. 3 shows how this may be done.

The thrust bearing 19 of FIGS. 1 and 2 comprises an inner race 41 and an outer race 42 with rolling elements 43 therebetween. The inner race is secured to the shaft 11 by a nut 44 and also locates the inner members 45, 46 of a pair of labyrinth seals. The outer race is mounted in a two piece housing 47 having a radially inner part 48 spaced from a radially outer part 49, to define a cavity 40. To prevent rotation of the outer race of the bearings, dogs 70 on the outer race engage with dogs 71 on the radially inner part of the housing, and further dogs 72 on the radially inner housing engage dogs 73 on the radially outer part of the housing. The arrangement of dogs is such as to restrict only rotation of the outer race of the bearing.

The radially inner part is an assembly held together by bolts 50 and includes the outer members 51, 52 for the labyrinth seals, a member 53 to provide a "squeeze film" space 54 between itself and the outer race of the bearing, and a flange 55 engaging an annular groove 57 in the radially outer part of the housing 49. Between the radially inner and outer parts is the cavity 40 in which there is a flanged toroidal ring 58 collapsible under a large out of balance load. It will be appreciated that the toroidal ring could be replaced by other constructions capable of being collapsed under a large out of balance load. For example, the invention contemplates the use of a plurality of tubes whose axes are parallel to the original shaft axis and which are arranged in an annular array between the radially inner and outer parts. By varying the wall thickness of such a plurality of tubes it is possible to "tune" them to collapse under a required predetermined load. The toroidal ring is secured to the outer part by bolts 59 passing through the flange 60 of the ring and serves to locate the bearing radially under normal operating conditions of the engine. These bolts also serving to secure the entire housing to one end conical a concial structure 61 connected by bolts 62 to a web 63 which is an integral part of the engine casing. An extension 64 of the conical structure carries the first roller bearing 21.

On either side of the flange 55, between the flange 55 and the sides of the groove 57 are rings 65, 66. A spring 67 is disposed between the rings 65, 66 and the bottom of the groove 57, for urging the rings into a generally concentric position relative to the bearing housing.

In the event of loss of blading during operation of the engine the toroidal ring will progressively collapse under the applied radial load, thus permitting progressive deformation of the housing, i.e. change of the radial depth of the cavity 40. Deformation of the housing thus increases the radial freedom of movement of the bearing 19, and in this construction the deformation of the housing is damped by the progressive collapse of the ring 58. Within the constraints imposed on the inner part of the housing by the flange 55 and the rings 65, 66 the shaft can deflect, and the thrust bearing 19 will move in an arc about the forward node point 33. The position of this node point will (as previously explained) vary along the axis as the deflection of the forward end of the shaft increases.

The movement of the thrust bearing is accommodated by movement of the flange in the annular groove between the two rings. The flange has parallel frusto-spherical surfaces 68 the radii of which correspond to the position of the forward node point 33 that is associated with the most probable deflection of the shaft. This deflection may be predicted from statistical observations on the amount of blading lost following the ingestion of a bird.

It will seen that displacement of the rings will accommodate the movements of the flange associated with a wide variation in the position of the forward node point and at the same time that the flange 55 is always transmitting the axial loads on the shaft to the engine casing via the rings and the conical structure. Thus the thrust bearing is always located in both the forward and rearward directions within the limits set by the arrangement of the flange, the rings and the annular groove.

A further advantage of the construction as shown is that the outer members 51, 52 of the labyrinth seals are connected to the outer race of the bearing for movement therewith and not to the fixed structure, deflection of the shaft does not therefore result in destruction of the seals and hence lubrication of the bearing is unaffected by the shaft deflection.

In practice it is helpful to build a degree of flexibility into the conical structure supporting the thrust bearing housing.

I claim:

1. A bearing assembly including a shaft having a longitudinal axis, a bearing supporting the shaft for rotation about the longitudinal axis in a non-rotating structure, said structure having radially inner and outer parts, means being provided between said parts of the structure for locating the bearing radially during normal rotation of the shaft, which means is also capable of allowing the shaft to deflect about a node point on the axis under abnormal out of balance loads, wherein the improvement comprises a flange on one of the parts of said structure having surfaces extending generally tangetially to a radius struck from an estimated mean position of said node point, means defining a recess in the other part of the structure into which the flange projects and a pair of rings in the recess, one on each side of the flange, and each of which has a first surface which slidingly engages one of said surfaces of the flange and a second surface which slidingly engages the recess, the rings being movable within said recess towards and away from the axis so as to locate the flange and hence the bearing while the shaft rotates in its deflected condition whereby variations of the axial position of the node point can be accommodated.

2. A bearing assembly according to claim 1 wherein the flange has parallel frusto-spherical surfaces.

3. A bearing assembly according to claim 2 wherein the radius of the frusto-spherical surfaces corresponds to the most probable deflection of the shaft.

4. A bearing assembly according to claim 1 and wherein there is provided a second bearing and means to allow said shaft to rotate therein during orbiting movement of the shaft.

5. A bearing assembly according to claim 1, wherein the means for locating the bearing during normal rotation of the shaft, and for allowing the shaft to deflect under abnormal out-of-balance loads comprises a collapsible ring which is stiff enough to withstand normal vibrational loads but which collapses progressively under increasing loads when the out-of-balance loads reach a pre-determined minimum.

6. A bearing assembly according to claim 1, and wherein spring means are provided which co-operate with the recess to urge the rings into contact with the surfaces of the flange.

7. A bearing assembly according to claim 1, and wherein there is provided a second bearing and means to allow said shaft to rotate therein during deflected rotation.

8. A bearing assembly according to claim 1, wherein the bearing includes means in the non-rotating structure for damping the normal vibrations during normal rotation of the shaft.

9. A bearing assembly according to claim 8, wherein the damping means is a hydrodynamic squeeze film.

* * * * *